United States Patent [19]

Fritz et al.

[11] Patent Number: 4,614,142
[45] Date of Patent: Sep. 30, 1986

[54] CIRCULAR CUTTER SHEARS FOR THE LONGITUDINAL EDGING OF PLATES AND SHEETS

[75] Inventors: Manfred Fritz, Erkrath; Hans Scheel, Velbert; Gerhard Wangerin, Langenfeld, all of Fed. Rep. of Germany

[73] Assignee: SMS Schloemann-Siemag Aktiengesellschaft, Dusseldorf, Fed. Rep. of Germany

[21] Appl. No.: 626,780

[22] Filed: Jul. 2, 1984

[30] Foreign Application Priority Data

Jul. 1, 1983 [DE] Fed. Rep. of Germany ....... 3323717
Jun. 8, 1984 [DE] Fed. Rep. of Germany ....... 3421331

[51] Int. Cl.$^4$ .............................................. B23D 19/04
[52] U.S. Cl. ...................................... 83/496; 83/481; 83/497; 83/503; 83/666; 83/698
[58] Field of Search ................. 83/497, 496, 500, 503, 83/666, 481, 698

[56] References Cited

U.S. PATENT DOCUMENTS

| 559,179 | 4/1896 | Koegel | 83/497 |
| 710,360 | 9/1902 | Hull | 83/497 X |
| 1,462,478 | 7/1923 | Beynon et al. | 83/503 X |
| 1,651,654 | 12/1927 | Williams | 83/497 X |
| 3,186,282 | 6/1965 | Waterhouse | 83/497 |
| 3,364,803 | 1/1968 | Senftleben | 83/503 |
| 3,459,086 | 8/1969 | Reeder, Jr. | 83/496 X |
| 3,612,367 | 10/1971 | Benz et al. | 83/496 X |
| 3,863,537 | 2/1975 | Huelsman | 83/503 |

FOREIGN PATENT DOCUMENTS

| 727046 | 10/1942 | Fed. Rep. of Germany | 83/503 |
| 21544 | of 1895 | United Kingdom | 83/497 |

Primary Examiner—Frank T. Yost
Attorney, Agent, or Firm—Holman & Stern

[57] ABSTRACT

Circular cutter shears are provided with an upper circular cutter shaft inclined towards the surface of the plate and a horizontally mounted lower circular cutter shaft. In order to prevent narrowing of the cutter clearance and jamming in the cutting engagement, the inclined upper circular cutter shaft is swung, with its end remote from the cutter, by an offset angle $\beta$ opposite the direction of feed of the plate.

19 Claims, 6 Drawing Figures

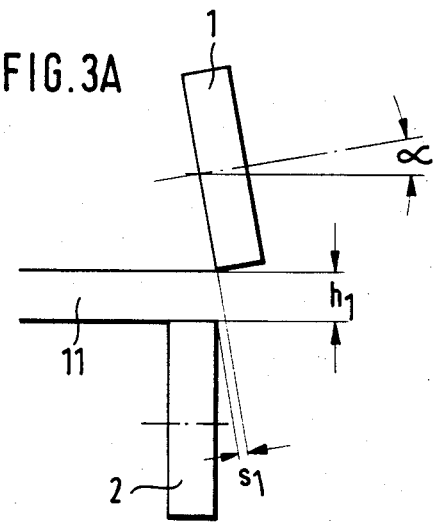
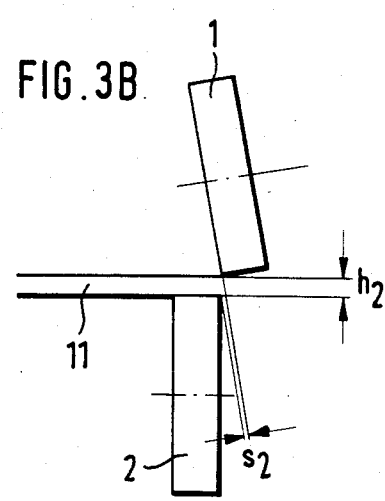
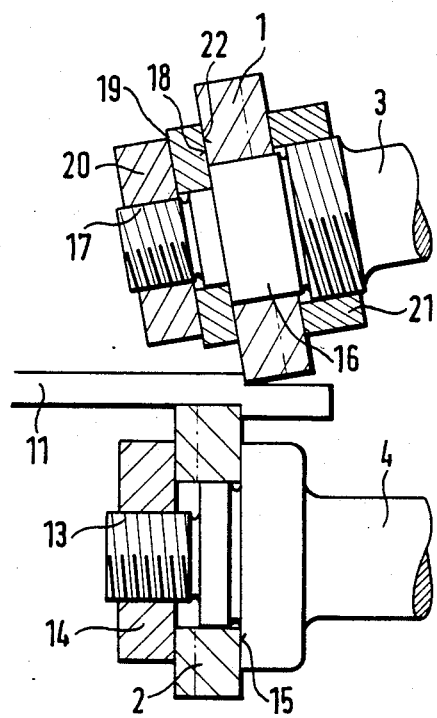
FIG. 4

CIRCULAR CUTTER SHEARS FOR THE LONGITUDINAL EDGING OF PLATES AND SHEETS

BACKGROUND OF THE INVENTION

1. Field of the Invention

The invention relates to circular cutter shears for the longitudinal edging of plates and sheets.

2. Description of the Prior Art

In known circular cutter shears for edging plates, in order to achieve straight and rectangular cut edges one of the circular cutter shafts is inclined with respect to the surface of the plate, while the other circular cutter shaft is mounted horizontally.

This arrangement of the circular cutters has the disadvantage that the cutter clearance changes in the cutting engagement, so that on account of the narrowing of the cutter clearance the cutter is scraped on the cut edge and thus increased cutter wear occurs and inexact cut edges are produced.

The object of the invention is to avoid the disadvantages of the known circular cutter shears. A more specific object is to provide circular cutter shears of simple design and operation, with which straight and rectangular cut edges are made possible and wear of the cutter shaft bearings and the circular cutters on account of the narrowing of the cutter clearance and jamming is prevented.

This object is attained according to the invention in that the circular cutter shaft inclined towards the surface of the plate is swung with its end remote from the cutter through an angle $\beta$ opposite the direction of feed of the plate. Thus, the rotation plane of the inclined cutter diverges from the said direction or the cut edge by the said angle.

This invention also provides shears for trimming the longitudinal edges of plates and sheets, comprising an upper circular cutter and a lower circular cutter defining therebetween a cutting gap for receiving a plate or sheet to be trimmed fed between the cutters, a lower cutter shaft carrying the lower cutter, mounted horizontally and transversely to the feed direction of the plates and sheets, and an upper cutter shaft which carries at an end thereof the upper cutter, the upper cutter shaft being inclined obliquely at an acute angle relative to the lower cutter shaft when seen in the feed direction, and therefore relative to the plate or sheet surface, the upper cutter shaft also being disposed obliquely relative to the feed direction whereby the axis of the shaft forms an acute angle of offset relative to a direction perpendicular to the feed direction.

The offset angle $\beta$ ensures that the circular cutting edge of the cutter runs free from the cut edge of the plate and that the edging strips are spread apart. The offset angle $\beta$ can amount for example to from 0.5 to 1° in the case of an angle of inclination $\alpha$ of 6°.

A particularly simple design of the circular cutter shears is achieved by the upper inclined cutter shaft being mounted non-displaceably and rotatably and the horizontally mounted lower cutter shaft being mounted in such a way as to be vertically adjustable. In this construction the adjustment of the cutter clearance is effected at the same time as the circular cutter disposed on the horizontally mounted cutter shaft is set to the plate thickness. It is not necessary to set the circular cutters in the axial direction.

Alternatively both upper and lower cutter shafts are vertically adjustable. By this means both a planar and a radial cutter grinding are possible without alteration of the angle of inclination.

The cutter shafts are advantageously mounted in adjustable eccentrics for plate thickness setting.

In the case of the shears according to the invention a predetermined angle of inclination $\alpha$ and offset angle $\beta$ can be provided in a structural form for the plate thickness range to be cut. For the purpose of adjustment to different plate thicknesses over a larger plate thickness range, however, the angle of inclination $\alpha$ and/or the offset angle $\beta$ can be made adjustable in operation.

In a further development of the invention a circular cutter shaft is stepped towards its end beyond a receiving pin for the circular cutter, and a stop ring, against whose annular surface projecting beyond the receiving pin the circular cutter can be clamped, and can be held against the lateral step surface.

In this way a circular cutter fastening is produced which is not affected by cutter wear.

Threaded nuts or hydraulic nuts can be provided as clamping elements for the circular cutters.

BRIEF DESCRIPTION OF THE DRAWINGS

Exemplary embodiments of the invention will now be described in detail with reference to the accompanying drawings, wherein:

FIGS. 3a and 3b are schematic views showing two lower cutter positions;

FIG. 4 is a cross-sectional view of circular cutter mountings on the cutter shafts;

DETAILED DESCRIPTION

Figure 1:
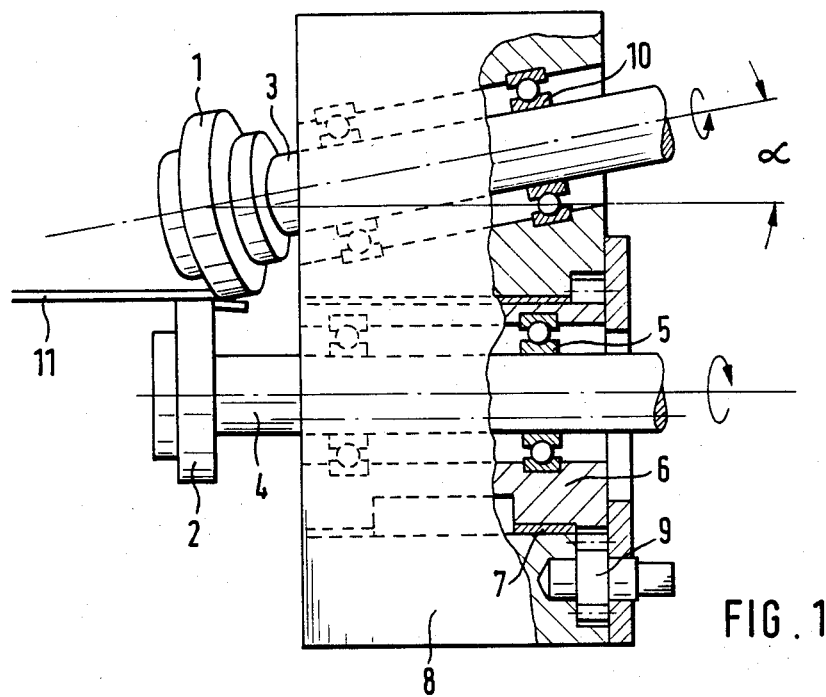
FIG. 1 is an elevational view partially in cross section of circular cutter shears embodying the invention.
Figure 2:
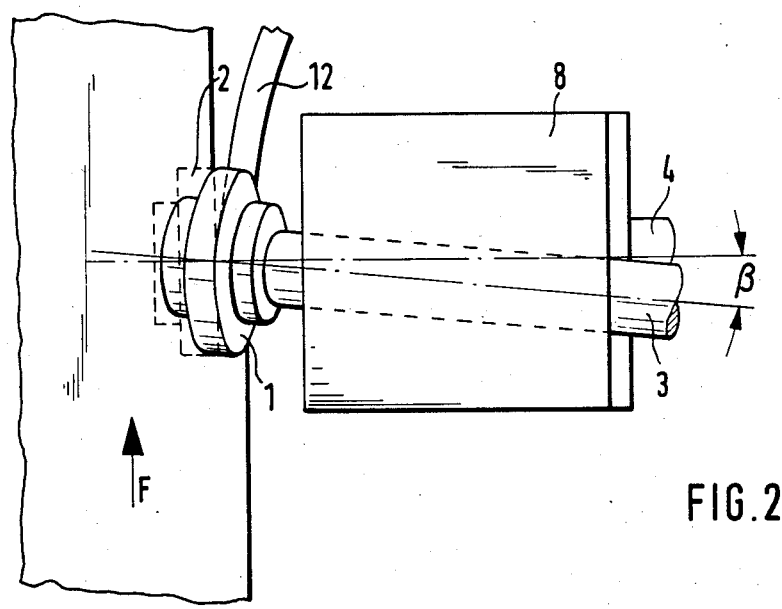
FIG. 2 is a top plan view of the edging shears according to FIG. 1.

In the circular cutter shears illustrated in FIGS. 1 and 2 an upper and lower circular cutter 1 and 2 are secured to an upper and a lower cutter shaft 3 and 4 respectively. The lower circular cutter shaft 4 is rotatably mounted in a horizontal position by means of rolling bearings 5 in an eccentric sleeve 6 which in turn is held rotatably in a machine housing 8 by means of a bushing 7. A control transmission 9 is provided for rotating the eccentric sleeve 6.

The upper circular cutter shaft 3 is inclined at an angle $\alpha$ with respect to the metal plate 11 in rolling bearings 10 and is rotatably mounted in the machine housing 8 with its axis, as seen in top plan view 2, swivelled through an offset angle $\beta$ opposite the direction of feed F. An offset angle $\beta$ of from 0.5 to 1° for example may be set in the case of an angle of inclination $\alpha$ of 6°. The two circular cutter shafts 3 and 4 may be freely rotatable by virtue of the advance of the plate or either or both may be provided with a rotary drive (not shown).

FIG. 2 shows an edging strip 12 being bent away from the sheet 11 on account of the angled position of the upper circular cutter according to the invention.

Figure 5:
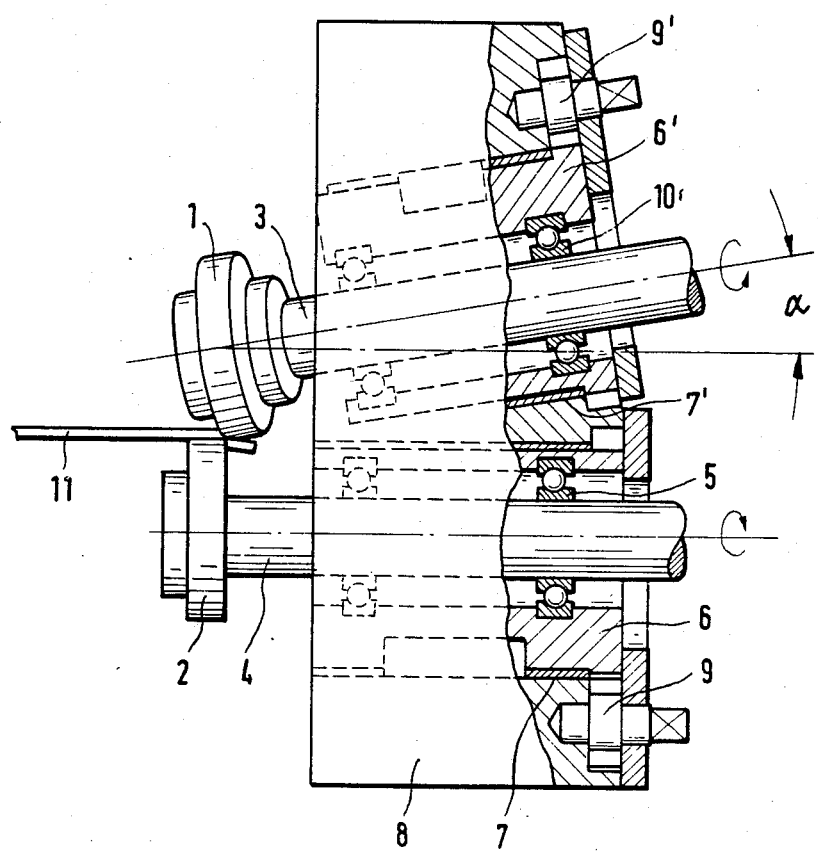
FIG. 5 is a vertical cross-sectional view of circular cutter shears in a second embodiment of the invention.

In the circular cutter shears illustrated in FIG. 5 the upper circular cutter shaft 3 is also vertically adjustable. The cutter shaft 3 is rotatably mounted in rolling bearings 10 in an eccentric sleeve 6' which in turn is held rotatably in the machine housing 8 by means of a bushing 7'. A control transmission 9' is provided for rotating the eccentric sleeve 6'.

The lower cutter positions illustrated in FIGS. 3a and 3b show that the cutter clearance $S_1$ occurring in the case of a substantial sheet thickness $h_1$ is, when the vertical position of the lower circular cutter 2 is raised to the smaller sheet thickness $h_2$, automatically reduced, without axial displacement of a circular cutter 1 or 2, to a correspondingly smaller width $S_2$.

The illustrated circular cutter shears, with cutter shafts 3 and 4 mounted one above the other at one end without axial displacement, is provided with a circular cutter mounting according to FIG. 4 which is not affected by cutter wear. The lower circular cutter 2 is clamped by a nut 14 screwed onto a threaded stub 13 against a stop collar 15 of the lower circular cutter shaft 4. The upper circular cutter shaft 3 is stepped to form a threaded stub 17 beyond a receiving pin 16 for the upper circular cutter 1. A stop ring 19 is held by a nut 20 against the stepped surface 18. The stop ring 19 thus forms an unchangeable abutment, against whose annular surface 22 the circular cutter 1 is clamped by a nut 21.

In this way invariable bearing surfaces are provided for the cutting surfaces of both circular cutters 1 and 2 determining the cutter clearance, so that the cutter clearance does not alter the event of wear of the cutters.

Figure 4A:
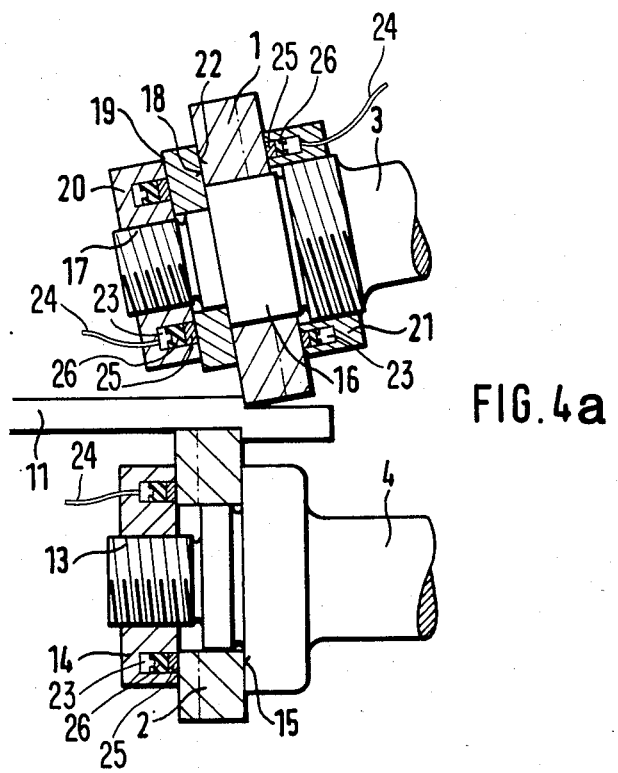
FIG. 4a is a view similar to FIG. 4 showing hydraulic nuts for clamping the cutters.

One or more of the nuts 14, 20, 21 may be a conventional hydraulic nut of well known type, as shown in FIG. 4a, comprising an annular chamber 23 in the nut body, opening at a side face of the nut adjacent the component to be clamped, a pressure ring 25 mounted movably in the open side of the chamber for pressing against the component to be clamped, a seal ring 26 behind the pressure ring, and a pressure fluid line 24 communicating with the chamber 23 for applying fluid pressure to urge the pressure ring 25 against the component to be clamped. Suitable hydraulic clamping nuts are commercially available.

In the embodiment described, the tilt angle $\alpha$ and the offset angle $\beta$ are fixed by the construction of the apparatus and cannot be adjusted. To allow adjustment of either or both of these angles, the upper cutter shaft 3 may be mounted in the housing 8 through adjustable means allowing the shaft to be tilted up or down, and /or to be swivelled back and forth. Suitable shaft mounting means permitting such adjustment will readily suggest themselves to the skilled reader and are therefore not disclosed in detail.

What we claim:

1. Shears for trimming the longitudinal edges of plates and sheets, comprising: a bearing support member; an upper circular cutter and a lower circular cutter defining therebetween a cutting gap for receiving a plate or sheet material to be trimmed fed between the cutters; a lower cutter shaft journalled in said bearing support member and having a free end projecting therefrom carrying the lower cutter mounted horizontally and transversely to the feed direction of the plate or sheet material; and an upper cutter shaft journalled in said bearing support member and having a free end projecting therefrom carrying said upper cutter; said upper cutter shaft extending obliquely downwardly toward said free end thereof at an acute angle $\alpha$ relative to said lower cutter shaft when viewed in the feed direction, and therefore relative to the plate or sheet material surface, said upper cutter shaft also extending obliquely relative to the feed direction so that the axis of said upper cutter shaft forms an acute angle of offset $\beta$ relative to a direction perpendicular to the feed direction thereby causing said upper cutter to diverge from the cut edge of the material being trimmed.

2. Edge trimming shears as claimed in claim 1 wherein means are provided for mounting said upper cutter shaft to be non-displaceable but rotatable about its axis, and means are provided for mounting said lower cutter shaft for vertical adjustment of said lower cutter shaft.

3. Edge trimming shears as claimed in claim 2 wherein said mounting means comprises bearings for said adjustable lower cutter shaft, and adjustable eccentric means in which said bearings are mounted so that adjustment of said eccentric means produces said vertical adjustment of said lower cutter shaft.

4. Edge trimming shears as claimed in claim 1 wherein means are provided for mounting said upper cutter shaft and said lower cutter shaft for vertical adjustment of said shafts.

5. Edge trimming shears as claimed in claim 4 wherein said mounting means comprises bearings for said adjustable cutter shafts, and adjustable eccentric means in which said bearings are mounted so that adjustment of said eccentric means produces said vertical adjustment of said cutter shafts.

6. Edge trimming shears as claimed in claim 1 wherein: at least one of said cutter shafts is provided in an end region with a receiving pin for the respective associated circular cutter, a stepped region of reduced diameter adjoining said pin between said pin and the adjacent end of the shaft, a stepped surface between said receiving pin and said reduced diameter region, a stop ring disposed on said reduced diameter region and projecting radially beyond the surface of said cutter-receiving pin for clamping the respective cutter, and means for clamping said stop ring against said stepped surface.

7. Edge trimming shears as claimed in claim 6 and further comprising: means for clamping the respective cutter against said stop ring.

8. Edge trimming shears as claimed in claim 6 wherein: said means for clamping said stop ring against said stepped surface comprises a screw threaded nut operatively mounted on said at least one of said cutter shafts.

9. Shears for trimming the longitudinal edges of plates and sheets, comprising: an upper circular cutter and a lower circular cutter defining therebetween a cutting gap for receiving a plate or sheet to be trimmed fed between the cutters; a lower cutter shaft carrying the lower cutter, mounted horizontally and transversely to the feed direction of the plates and sheets; and an upper cutter shaft which carries at an end thereof the upper cutter, the upper cutter shaft being disposed obliquely at an acute angle relative to the lower cutter shaft when viewed in the feed direction and therefore relative to the plate or sheet surface; wherein at least one of said cutter shafts is provided in an end region thereof with a receiving pin for the respective associated circular cutter, a stepped region of reduced diameter adjoining said pin between said pin and the adjacent end of the shaft, a stepped surface between said receiving pin and said reduced diameter region, a stop ring disposed on said reduced diameter region and projecting radially beyond the surface of said cutter-receiving pin for clamping the respective cutter, means for clamping said stop ring against said stepped surface, and means for clamping the respective cutter against said stop ring.

10. Shears for trimming the longitudinal edges of plates and sheets, comprising: an upper circular cutter and a lower circular cutter defining therebetween a cutting gap for receiving a plate or sheet to be trimmed fed between the cutters; a lower cutter shaft, on which said lower cutter is mounted, mounted horizontally and transversely to the feed direction of the plates and sheets; an upper shaft, on an end of which said upper cutter is mounted, said upper cutter shaft being disposed obliquely at an acute angle relative to said lower cutter shaft when viewed in the feed direction and therefore relative to the plate or sheet surface, said upper cutter shaft also being disposed obliquely relative to the feed direction so that the axis of said upper cutter shaft forms an acute angle of offset relative to a direction perpendicular to the feed direction; and wherein at least one of said cutter shafts is provided in an end region thereof with a receiving pin for the respective associated circular cutter, a stepped region of reduced diameter adjoining said pin between said pin and the adjacent end of the shaft, a stepped surface between said receiving pin and said reduced diameter region, a stop ring disposed on said reduced diameter region and projecting radially beyond the surface of said cutter-receiving pin for clamping the respective cutter, and means for clamping said stop ring against said stepped surface.

11. Edge trimming shears as claimed in claim 10 and further comprising: means for clamping the respective cutter against said stop ring.

12. Edge trimming shears as claimed in claim 11 wherein: said means for clamping the respective cutter against said stop ring comprises a screw threaded nut operatively mounted on said at least one of said cutter shafts.

13. Edge trimming shears as claimed in claim 11 wherein: said means for clamping the respective cutter against said stop ring comprises a hydraulic nut operatively mounted on said at least one of said cutter shafts.

14. Edge trimming shears as claimed in claim 10 wherein: said means for clamping said stop ring against said stepped surface comprises a screw threaded nut operatively mounted on said at least one of said cutter shafts.

15. Edge trimming shears as claimed in claim 10 wherein: said means for clamping said stop ring against said stepped surface comprises a hydraulic nut operatively mounted on said at least one of said cutter shafts.

16. Edge trimming shears as claimed in claim 10 wherein: said means for clamping said stop ring against said stepped surface comprises a hydraulic nut operatively mounted on said at least one of said cutter shafts.

17. Shears for trimming the longitudinal edges of plates and sheets, comprising: a bearing support member; an upper circular cutter and a lower circular cutter defining therebetween a cutting gap for receiving a plate or sheet to be trimmed fed between the cutters; a lower cutter shaft journalled in said bearing support member and having a free end projecting therefrom carrying the lower cutter mounted horizontally and transversely to the feed direction of the plates and sheets; an upper cutter shaft journalled in said bearing support member and having a free end projecting therefrom carrying said upper cutter; said upper cutter shaft extending obliquely downwardly toward said free end thereof at an acute angle $\alpha$ relative to said lower cutter shaft when viewed in the feed direction, and therefore relative to the plate or sheet surface; said upper cutter shaft also extending obliquely relative to the feed direction so that the axis of said upper cutter shaft forms an acute angle of offset relative to a direction perpendicular to the feed direction; a receiving pin in an end region of at least one of said cutter shafts for the respective associated circular cutter; a stepped region of reduced diameter adjoining said pin between said pin and the adjacent end of the shaft; a stepped surface between said receiving pin and said reduced diameter region, a stop ring disposed on said reduced diameter region, a stop ring disposed on said reduced diameter region and projecting radially beyond the surface of said cutter-receiving pin for clamping the respective cutter, and means for clamping said stop ring against said stepped surface.

18. Edge trimming shears as claimed in claim 17 and further comprising: means for clamping the respective cutter against said stop ring.

19. Edge trimming shears as claimed in claim 17 wherein: said means for clamping said stop ring against said stepped surface comprises a hydraulic nut operatively mounted on said at least one of said cutter shafts.

* * * * *